United States Patent [19]

Koyama et al.

[11] 3,888,717
[45] June 10, 1975

[54] SYSTEM FOR SUCCESSIVELY SPLICING BIAS-CUT PIECES OF RUBBER CLOTH

[75] Inventors: Masao Koyama, Hatano; Noboru Okada, Fujisawa; Masahiro Ogawa, Hiratsuka, all of Japan

[73] Assignee: The Yokohama Rubber Co., Ltd., Japan

[22] Filed: Sept. 21, 1973

[21] Appl. No.: 399,601

[30] Foreign Application Priority Data
Nov. 24, 1972 Japan............................ 47-118260

[52] U.S. Cl. ............... 156/351; 156/159; 156/363; 156/558
[51] Int. Cl. ..................... B32b 31/10; G05g 15/00
[58] Field of Search ............ 156/73, 157, 159, 264, 156/266, 285, 502, 507, 512, 517, 538, 539, 558, 559, 567, 351, 363

[56] References Cited
UNITED STATES PATENTS

| | | | |
|---|---|---|---|
| 2,962,083 | 11/1960 | Hasselquist | 156/512 |
| 3,192,094 | 6/1965 | Phillips et al. | 156/353 |
| 3,630,808 | 12/1971 | Shinjiro Yasui | 156/73.6 |

Primary Examiner—William A. Powell
Assistant Examiner—Brian J. Leitten
Attorney, Agent, or Firm—Toren, McGeady and Stanger

[57] ABSTRACT

Successive pieces of rubber cloth, cut on the bias from a continuous strip of such rubber cloth, are transported by gravity onto the trough of a vibrating conveyor and are thereby conveyed forwardly each with one edge thereof in sliding contact with a guide plate formed on the corresponding edge of the trough. A splicer is provided forwardly of the vibrating conveyor for joining end to end the successive pieces of rubber cloth fed onto its table by the conveyor. The splicer comprises a stop adapted to arrest the motion of each piece of rubber cloth in a predetermined position on the table, and a hollow suction arm supported horizontally above the table so as to be in registration with the leading edge of each rubber cloth piece stopped in the aforesaid predetermined position. The suction arm as well as the stop is movable both vertically and horizontally so that the leading edge of each rubber cloth piece, releasably adhered to the suction arm when the same is in a depressed position, is thereby elevated, carried forwardly over the table, and pressed down onto the trailing edge of a preceding rubber cloth piece. A take-up conveyor carries the thus-spliced pieces of rubber cloth away from under the suction arm by indexed movement. The entire system can be fully automated by control means also disclosed herein.

10 Claims, 18 Drawing Figures

SYSTEM FOR SUCCESSIVELY SPLICING BIAS-CUT PIECES OF RUBBER CLOTH

BACKGROUND OF THE INVENTION

This invention relates to a system for successively splicing parallelogram-shaped pieces of rubber cloth, and more specifically to a system for joining the selvages of successive pieces of rubber cloth, cut on the bias from a continuous strip thereof, for use later in the manufacture of vehicle tires and like products.

Conventionally, such bias-cut pieces of rubber cloth have usually been spliced either by: (1) manually carrying the successive rubber cloth pieces onto the table of a known splicer mechanism and then also manually readjusting their positions on the table; or (2) successively conveying the rubber cloth pieces from a bias cutter onto the splicer table through an inclined chute and then manually readjusting their positions. It will be apparent that such manual procedures do not permit efficient splicing operation, especially when a large number of the bias-cut pieces of rubber cloth must be handled.

There have more recently been developed systems incorporating a belt conveyor positioned anterior to the splicer mechanism. The bias-cut pieces of rubber cloth are successively fed onto the belt conveyor by various means. However, these prior art systems have involved very complex and expensive mechanisms to properly reorient the successive bias-cut rubber cloth pieces on the belt conveyor before they are fed into the splicer mechanism, due for the most part to the adherent and highly yielding properties of the rubber cloth. As an additional disadvantage, the leading edge of each rubber cloth piece tends to be caught in the gap between the belt conveyor and the splicer table. Even if this difficulty is overcome, it is very difficult to feed, by means of the belt conveyor only, the leading edge of each rubber cloth piece to a prescribed splicing position on the table. Moreover, since the belt conveyor is usually operated at high speed, it has heretofore been possible only at the expense of highly involved control equipment to stop each rubber cloth piece in the prescribed position on the table, because of the inevitable inertia of the belt conveyor and the frictional resistance exerted thereby to each rubber cloth piece.

The two successive pieces of rubber cloth joined end to end on the splicer table must then be fed a predetermined distance, usually by another belt conveyor positioned posterior to the splicer mechanism, so that the trailing edge of the second rubber cloth piece will lie in the aforesaid splicing position to permit the leading edge of the succeeding rubber cloth piece to be placed thereon. Since the two belt conveyors are thus mounted on both sides of the splicer mechanism in accordance with the prior art, it has been necessary to exactly synchronize the operations of both conveyors in order to prevent the spliced rubber cloth pieces from being unduly tensed or slackened as they are taken up by the second conveyor. This objective, however, is difficult to accomplish because the operating characteristics of the two belt conveyors usually differ.

SUMMARY OF THE INVENTION

In view of the listed deficiencies of the prior art, it is an object of this invention to provide an inexpensive, durable and highly efficient system for splicing successively supplied parallelogrammatic pieces of rubber cloth which usually are bias-cut from an elongate strip of such rubber cloth.

Another object of the invention is to provide rubber cloth splicing system which is well adapted to handle a large number of successive pieces of rubber cloth and which requries little attention from an operator throughout the course of their conveyance, orientation, splicing and take-up operations.

A further object of the invention is to provide a rubber cloth splicing system which can be fully automated by simple and inexpensive control equipment.

A further object of the invention is to provide a rubber cloth splicing system which includes a vibrating conveyor positioned anterior to a splicer, such that each piece of rubber cloth can be automatically fed to a predetermined position on the table of the splicer in a properly oriented manner.

A further object of the invention is to provide a rubber cloth splicing system wherein the splicer includes a suction arm movable both vertically and horizontally, whereby the leading edge of each piece of rubber cloth which has been fed to the predetermined position on the splicer table can be transported onto the trailing edge of a preceding rubber cloth piece in neat registration therewith for uniform splicing operation.

A further object of the invention is to provide a rubber cloth splicing system wherein upon completion of each splicing operation of two successive rubber cloth pieces, they are fed a predetermined distance from under the suction arm of the splicer by a take-up conveyor while the vibrating conveyor is also in operation, so that the spliced rubber cloth pieces are not to be tensed or slackened during this take-up operation.

A still further object of the invention is to provide a rubber cloth splicing system wherein the trough of the vibrating conveyor and the table of the splicer are mounted substantially on the same plane and with a minimum spacing therebetween, so that each piece of rubber cloth, no matter how yielding it is, can easily be fed from the former onto the latter.

With these objects in view and the other objects hereinafter set forth, this invention provides a system which includes a vibrating conveyor onto which parallelogram-shaped pieces of rubber cloth are supplied successively with prescribed spacings from one to the next. The vibrating conveyor includes a guide plate formed on one edge of its trough, the guide plate being preferably perforated to cause the escape therethrough of the air which tends to be trapped under each of the successive pieces of rubber cloth on the vibrating trough, so that each rubber cloth piece is fed forwardly with one edge thereof in neat sliding contact with the guide plate.

A splicer mounted forwardly of the vibrating conveyor includes an elongate stop supported horizontally above its table for arresting the motion of each rubber cloth piece, still being fed by the vibrating conveyor, in a predetermined position on the table. A suction arm is also supported horizontally above the table in side-by-side relationship to the stop so as to be in registration with the leading edge of each rubber cloth piece being held in the said predetermined position on the table. The suction arm is movable both vertically and horizontally, while the stop is movable vertically in substantial sliding contact with the suction arm. Thus, releasably adhered to the suction arm by suction exerted through one or more apertures formed therein, the leading edge of each rubber cloth piece is thereby elevated, carried forwardly over the table, and pressed down onto the trailing edge of a preceding rubber cloth piece.

Upon completion of each splicing operation, the rubber cloth pieces thus joined end to end are fed a predetermined distance from under the suction arm by a take-up conveyor so that the trailing edge of the last of the spliced rubber cloth pieces is brought to such a position on the splicer table as to be overlaid by the leading edge of a succeeding rubber cloth piece.

The foregoing cycle of operation can be repeated automatically by the provision of control means which typically includes a plurality of photoelectric elements such as phototubes.

The features which are believed to be novel and characteristic of this invention are set forth with particularity in the appended claims. The invention itself, however, both as to its organization and mode of operation, together with the further objects and advantages thereof, will be best understood from the following description taken in conjunction with the accompanying drawings which illustrate, by way of example only, a preferred embodiment of the invention and in which like reference numerals designate like parts throughout the several views.

DESCRIPTION OF THE PREFERRED EMBODIMENT

Figure 1:
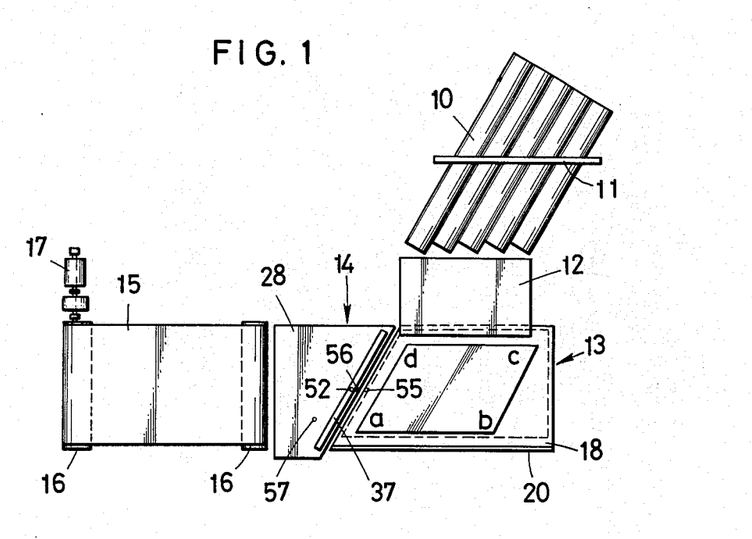
FIG. 1 is a schematic top plan view of a rubber cloth splicing system constructed according to the concepts of this invention.
Figure 2:
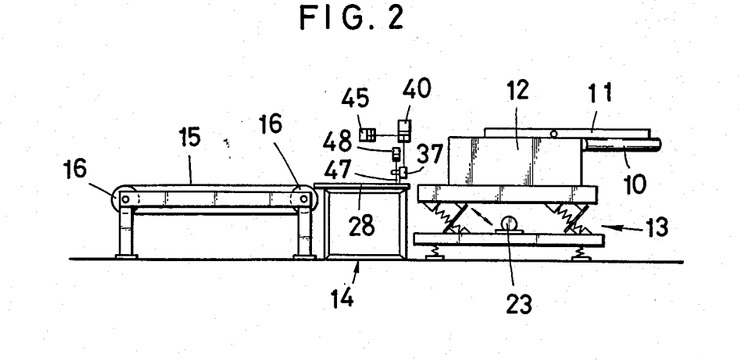
FIG. 2 is a schematic side elevational view of the system of FIG. 1.

With reference to FIGS. 1 and 2, which schematically illustrates an exemplified system according to the invention, an infeed conveyor is provided at 10 for conveying an elongate strip of rubber cloth at a prescribed angle to a bias cutter 11 whereby the strip of rubber cloth is successively cut on the bias into pieces of prescribed length. A chute 12 is mounted between the infeed conveyor 10 and a vibrating conveyor 13 for carrying onto the latter the successive parallelogram-shaped pieces of bias-cut rubber cloth by gravity. It is to be noted, however, that the constructions and operations of the aforesaid infeed conveyor 10, bias cutter 11 and chute 12 are well known and do not, by themselves, constitute features of this invention.

The vibrating conveyor 13 feeds the successive pieces of rubber cloth, while readjusting their positions, to a splicer 14 which joins the successive rubber cloth pieces end to end. A take-up conveyor 15 is provided next to the splicer 14 for carrying the spliced length of rubber cloth away therefrom by indexed movement. Typically, this take-up conveyor is in the form of an endless belt operating over a pair of terminal pulleys 16. A drive mechanism 17 is coupled to one of the pulleys 16 for imparting the indexed movement to the take-up conveyor 15.

Figure 4:
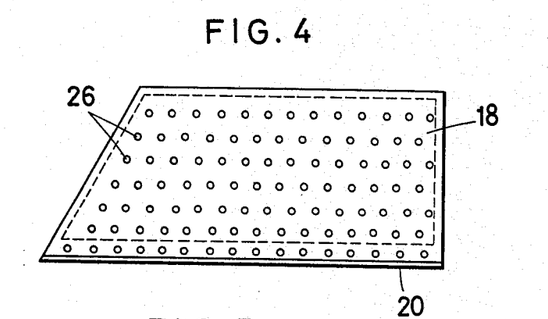
FIG. 4 is a top plan view of the vibrating conveyor of FIG. 3.
Figure 5:
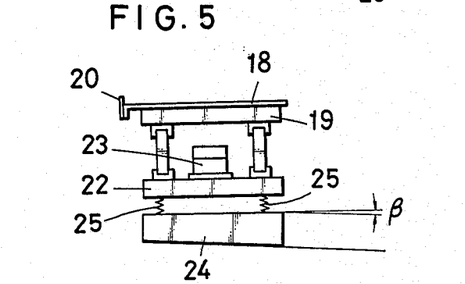
FIG. 5 is a right-hand end elevational view of the vibrating conveyor of FIG. 3.
Figure 6:
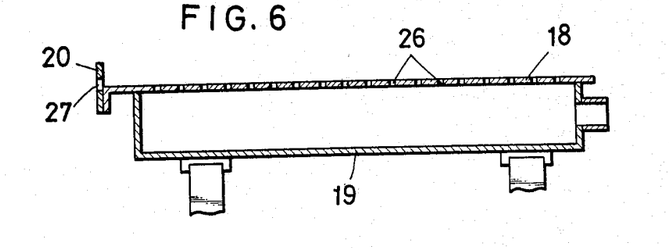
FIG. 6 is an enlarged vertical sectional view taken substantially along the plane of line 6—6 in FIG. 3.

FIGS. 3 to 6 illustrate the details of the vibrating conveyor 13. As best shown in FIG. 6, the vibrating conveyor 13 includes a flat trough 18 having an enclosed space 19 thereunder and a guide plate 20 along one edge thereof. The front edge of the trough 18 adjacent the splicer 14 is formed at an angle to the said one edge thereof exactly equal to the angle between the bias-cut edge $\overline{ab}$ and the selvage $\overline{ad}$ of the parallelogram-shaped pieces of rubber cloth shown in FIG. 1. The trough 18 is coupled through springs 21 to a vibrating plate 22 therebelow on which is mounted a vibrator 23. The vibrating plate 22 is further mounted on a base 24 through springs 25.

Figure 3:
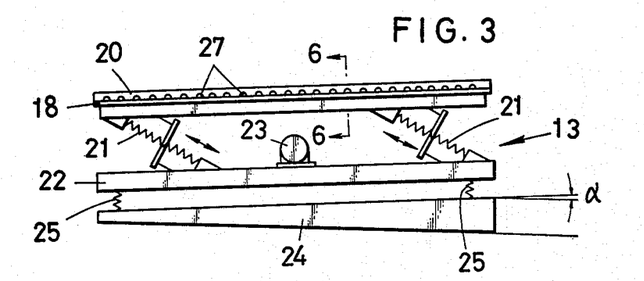
FIG. 3 is a side elevational view showing the details of a vibrating conveyor used in the system of FIGS. 1 and 2.

As seen in FIGS. 3 and 5, the top surface of the base 24 is inclined toward the splicer 14 at an angle $\alpha$, and toward the guide plate 20 at an angle $\beta$, relative to the plane of the horizon. It will also be seen that the vibrating plate 22 and the trough 18 are disposed at the same inclinations toward the splicer 14 and the guide plate 20, for purposes hereinafter made apparent.

FIGS. 4 and 6 best illustrate a number of perforations 26 formed through the trough 18 in communication with the enclosed space 19 thereunder. These bores are calculated to cause the escape therethrough of the air which tends to be trapped under each piece of bias-cut rubber cloth as the same in transported over the trough by vibration. The enclosed space 19 may be maintained at atmospheric or slightly less pressure in the meantime. Although the provision of this enclosed space 19 and perforations 26 is comfirmed to appreciably increase the speed of transportation of each piece of rubber cloth over the trough 18, they may be dispensed with altogether. Similarly, while the same purpose is also substantially accomplished by the above mentioned inclination $\alpha$ of the trough toward the splicer 14, it is not of absolute necessity to incline the trough toward the splicer.

However, it is preferable, or indeed essential, that a plurality of perforations 27 be formed through the guide plate 20 at appropriate spacings as in FIGS. 3 and 6 in order to cause the escape therethrough of the air trapped under each piece of bias-cut rubber cloth being transported over the trough 18. For, were it not for these perforations 27, the piece of rubber cloth would not advance properly along the guide plate 20 but would tend to move away therefrom due to the streams of air escaping from between the guide plate and the bias-cut edge $\overline{ab}$, FIG. 1, of the rubber cloth piece. It has been confirmed that this cannot be obviated merely by the provision of the aforesaid perforations 26 through the trough 18.

Figure 7:
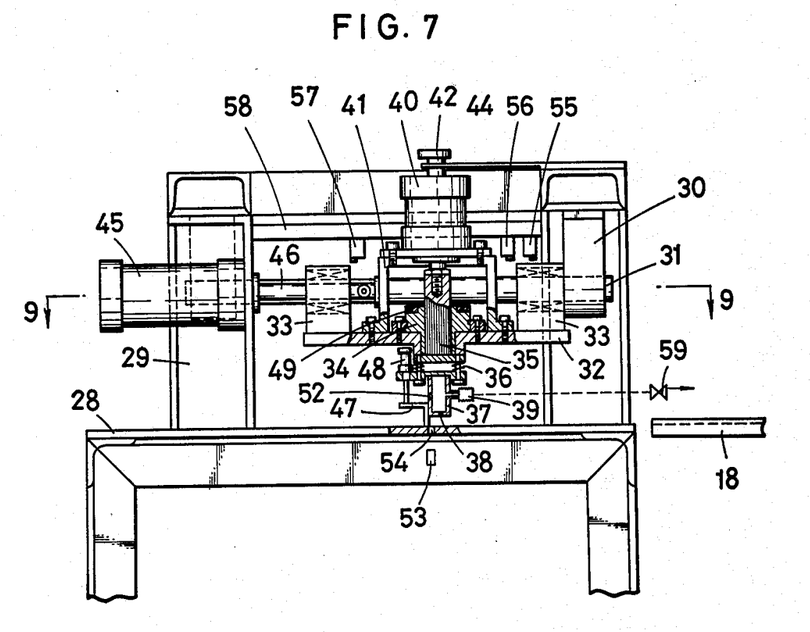
FIG. 7 is a side elevational view, partly in section, showing the details of a splicer used in the system of FIGS. 1 and 2.
Figure 8:
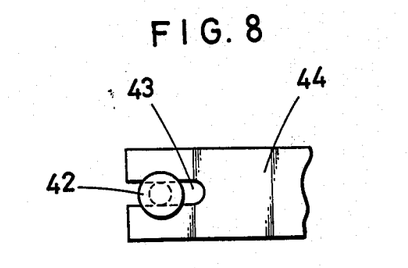
FIG. 8 is a fragmentary top plan view showing a stop slidably received in a slot of a stationary plate for limiting the motion of the piston in one of the power cylinders used in the splicer of FIG. 7.
Figure 9:
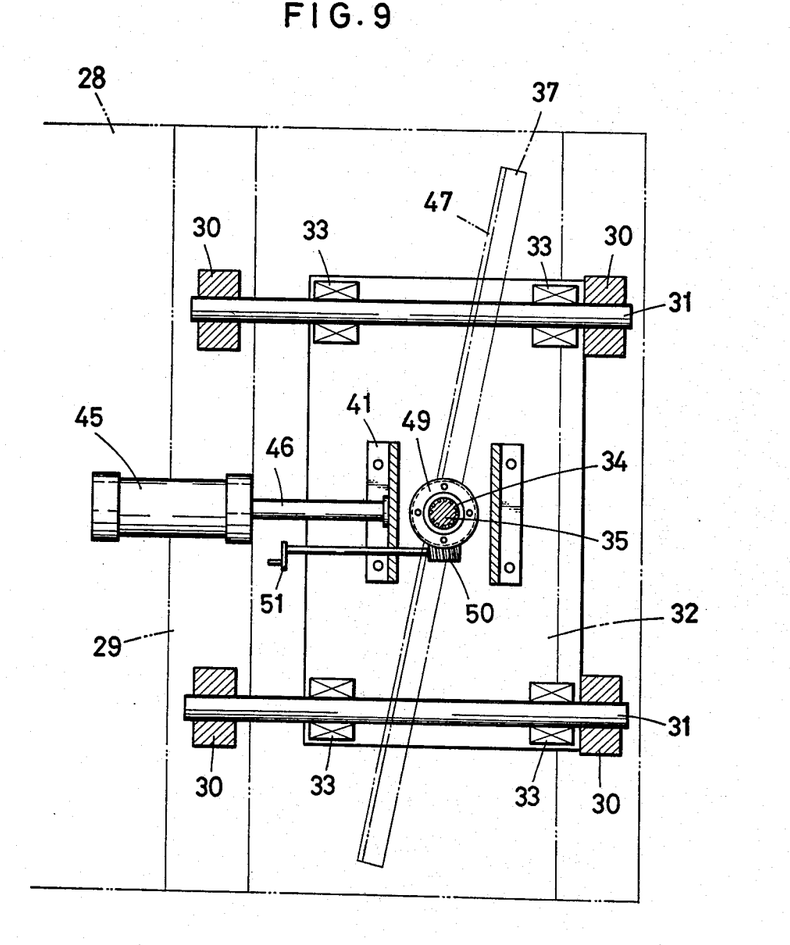
FIG. 9 is a horizontal sectional view taken along the plane of line 9—9 in FIG. 7.

FIGS. 7 to 9 illustrate the detailed construction of the splicer 14 previously set forth with reference to FIGS. 1 and 2. The splicer includes a table 28 having one edge thereof close to the aforementioned front edge of the trough 18 with a spacing of, say, not more than about 10 millimeters therebetween, as seen in FIG. 7 and also in FIG. 1. The top of the table 28 may be on the same level as, or slightly lower than, that of the trough 18. A frame 29 is securely mounted on the table 28, and four brackets 30 are fixed to the frame 29 to securely support a pair of guide rods 31 which extend horizontally and parallel to each other.

A carriage 32 is slidably supported by the guide rods 31 through bearings 33, and a support member 34 is rotatably mounted at the center of the carriage 32. The support member 34 has a bore extending vertically therethrough to receive an actuating rod 35 which is externally splined to make a sliding fit with corresponding internal splines of the support member. Coupled to the bottom end of the actuating rod 35 through helical compression springs 36 is a horizontally extending suction arm 37 having one or more, two in this embodiment, apertures 38 formed longitudinally at its bottom in communication with its hollowed interior. A flexible hose 39 extends between the suction arm 37 and any suitable means, not shown, adapted to create a desired degree of vacuum in the former.

The top end of the actuating rod 35 is coupled to the piston rod of a power cylinder 40, which may be driven either pneumatically or hydraulically, securely supported vertically on a mount 41 which in turn is substantially integrally formed on the carriage 32. A stop 42 adapted for purposes hereinafter made apparent may be coupled to the piston of the power cylinder 40 so as to be slidably engaged in a slot 43 of a stationary plate 44, FIG. 8, provided on the top of the frame 29. A power cylinder 45 supported horizontally by the frame 29 has its piston rod 46 coupled to the mount 41 to cause the various means mounted on the carriage 32 to reciprocate horizontally along the guide rods 31.

A stop 47 extends along the suction arm 37 throughout the length thereof and is disposed on the forward side of the suction arm, that is, away from the vibrating conveyor 13. As best shown in FIG. 7, the stop 47 is coupled to the piston rods of a plurality of, usually two, power cylinders 48 supported vertically by a bracket coupled to the suction arm 37, so that the stop is movable up and down in substantial sliding contact with the suction arm.

A worm wheel 49 is securely mounted on the aforesaid support member 34 rotatably mounted on the carriage 32, and a worm 50 manually revolvable by a handle 51 is meshed with the worm wheel 49, as best illustrated in FIG. 9. Thus, by manually turning the handle 51, the support member 34 and therefore the actuating rod 35 can be revolved relative to the carriage 32 in order to adjust the angular position of the suction arm 37 as well as the stop 47 in accordance with the angle at which the selvage $\overline{ad}$ of each piece of rubber cloth lies with respect to the adjacent bias-cut edge $\overline{ab}$ or $\overline{dc}$, as will be understood from FIG. 1.

As seen in FIG. 7, a photoelectric element is embedded at 52 in the suction arm 37, and a light source 53 is mounted below the splicer table 28 in registration with the photoelectric element 52 for irradiating the same through an aperture 54 formed in the table 28. The arrival of each bias-cut piece of rubber cloth at the stop 47 can thus be sensed by the photoelectric element 53. Three other photoelectric elements such as reflection-type phototubes 55, 56 and 57 are slidably supported by a rail 58 extending horizontally parallel to the guide rods 31 and supported at both ends thereof by the frame 29. Although not shown in the drawings, it is assumed that reflectors are mounted correspondingly on the table 28 in registration with the respective phototubes 55 to 57. The phototube 55 is adapted to switch the take-up conveyor 15 from high-speed to low-speed operation, the phototube 56 to switch the vibrating conveyor 13 from high-speed to low-speed operation, and the phototube 57 to stop the motion of the take-up conveyor 15, as hereinafter explained in further detail.

The preferred embodiment of this invention being configured substantially as hereinbefore described, its operation will now be described with reference directed also to FIGS. 10A to 10H and FIG. 11. Prior to setting the entire system of FIGS. 1 and 2 in operation, it is necessary that the angular position of the bias-cutter 11 relative to the infeed conveyor 10 be adjusted in accordance with the prescribed angle at which the elongate strip of rubber cloth is to be cut. Further by properly indexing the infeed conveyor 10 and the bias cutter 11 in accordance with the prior art, the strip of rubber cloth can be cut into pieces of prescribed length. It is also necessary to correspondingly adjust the angular position of the suction arm 37 and the positions of the phototubes 55 to 57.

Each bias-cut piece of rubber cloth is thus transported from the infeed conveyor 10 onto the vibrating conveyor 13 through the chute 12 by gravity. The rubber cloth piece stops as its bias-cut edge $\overline{ab}$ contacts the guide plate 20 on the trough 18. It is assumed that in this instance the vibrating conveyor 13 is already in high speed operation. Since it is very unlikely that the edge $\overline{ab}$ of the rubber cloth piece make any contact with the guide plate 20 when it is dropped onto the trough 18, the position of the rubber cloth piece must be readjusted so that its edge $\overline{ab}$ will held against the guide plate before its selvage $\overline{ad}$ reaches the stop 47 provided to the suction arm 37. It is to this end that the trough 18 is inclined as aforesaid toward the guide plate 20, and that the perforations 27 are formed through the guide plate.

Figure 10A:
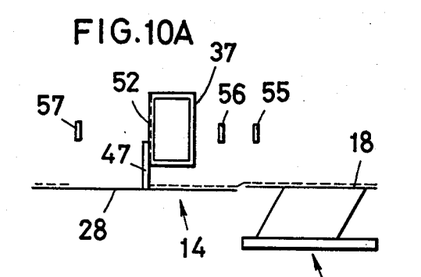
FIGS. 10A to 10H are schematic side elevational views of an explanatory nature sequentially showing the splicing operation by the system of FIGS. 1 and 2.

As will be seen from FIG. 3 in particular, the vibrator 23 mounted on the vibrating plate 22 imparts a forward motion to the rubber cloth piece through the trough 18, and the rubber cloth piece will thus be fed onto the table 28 of the splicer 14, with part of its edge $\overline{ab}$ still in contact with the guide plate 20. The vibrating conveyor 13 is switched from high-speed to low-speed operation when the leading edge $\overline{ad}$ of the rubber cloth piece has passed below the reflection-type phototube 56, and the rubber cloth piece is fed at low speed until its leading edge comes into contact with the stop 47, as illustrated in FIG. 10A. By thus operating the vibrating conveyor 13 at low speed matching the yieldingness of the rubber cloth, no slack will be produced in the rubber cloth piece even when the same is fed against the stop 47.

Figure 10B:
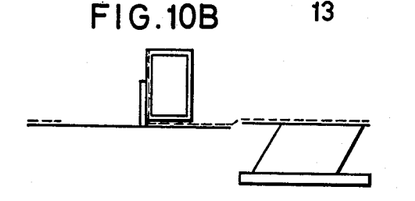

The contact of the leading edge of the rubber cloth piece with the stop 47 is sensed by the photoelectric element 52 embedded in the suction arm 37, and an electrical signal produced resultantly by the photoelectric element is utilized to cause the power cylinder 40 to lower the suction arm 37 to a position from about 0 to 2 millimeters above the rubber cloth piece. At the same time, a valve 59 shown in FIG. 7 is automatically opened to create a partial vacuum within the suction arm and hence to cause attachment of the leading edge of the rubber cloth piece to the bottom of the suction arm by suction exerted through its apertures 38, as illustrated in FIG. 10B.

If, in the above instance, the suction arm 37 were pressed forcibly against the rubber cloth piece by the power cylinder 40, the rubber cloth piece would remain stuck to the suction arm due to its adherent property, and not by suction, even after the succeeding splicing operation. This possibility is obviated according to the invention by arresting the downward motion of the suction arm in the above mentioned position from about 0 to 2 millimeters above the rubber cloth piece, by means of the stop 42 slidably engaged in the slot 43 of the stationary plate 44.

Figure 10C:
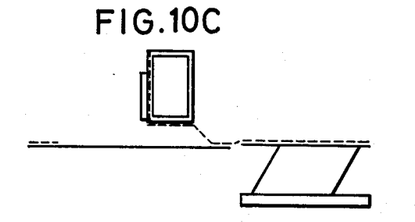
Figure 10D:
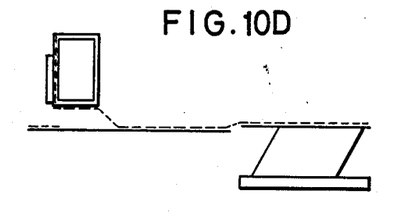

Upon attachment of the leading edge of the rubber cloth piece to the suction arm 37, the stop 47 is elevated by the power cylinders 48 to the position shown in FIG. 10C, and the suction arm 37 is succeedingly elevated to its initial position by the power cylinder 40 through the actuating rod 35. The power cylinder 45 becomes succeedingly operative to move the carriage 32 to the left, as seen in FIG. 7, over a predetermined distance along the guide rods 31, thereby carrying the suction arm 37 together with the stop 47 to the position shown in FIG. 10D. The leading edge of the rubber cloth piece which has been adhered to the suction arm is thus conveyed to a position above the trailing edge of the preceding rubber cloth piece which has been held standing by in a prescribed position on the table 28 of the splicer 14.

Figure 10E:
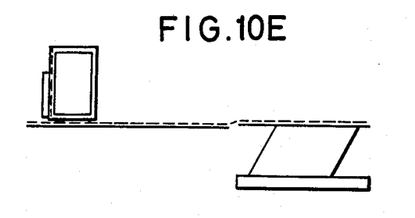
Figure 10F:
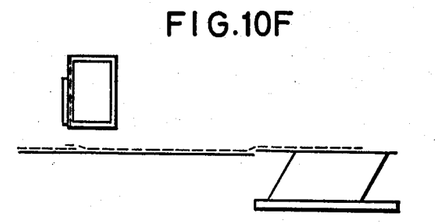
Figure 10G:
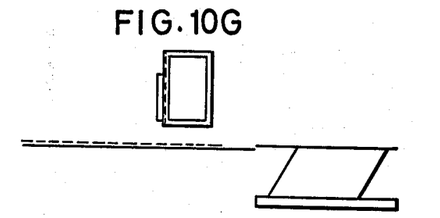

The power cylinder 40 becomes operative again to lower the suction arm 37 to such a degree that the leading edge of the rubber cloth piece now held by the suction arm is placed on and pressed against the trailing edge of the preceding rubber cloth piece, as will be understood from FIG. 10E. Since the stop 42 is no longer engaged in the slot 43 of the stationary plate 44, sufficient pressure can be exerted by the power cylinder 40 to cause adhesion of the two successive pieces of rubber cloth. The valve 59 is then closed, and the power cylinder 40 becomes operative once again to raise the suction arm 37 together with the stop 42 to the initial level with the result that the spliced pieces of rubber cloth are released from the suction arm, as illustrated in FIG. 10F. The suction arm 37 and the stop 42 are now moved horizontally back to the position shown in FIG. 10G by the power cylinder 45.

Figure 10H:
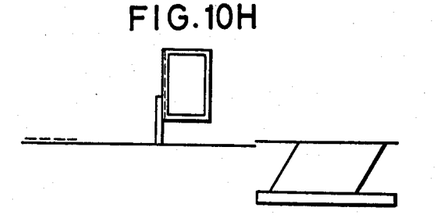
Figure 11:
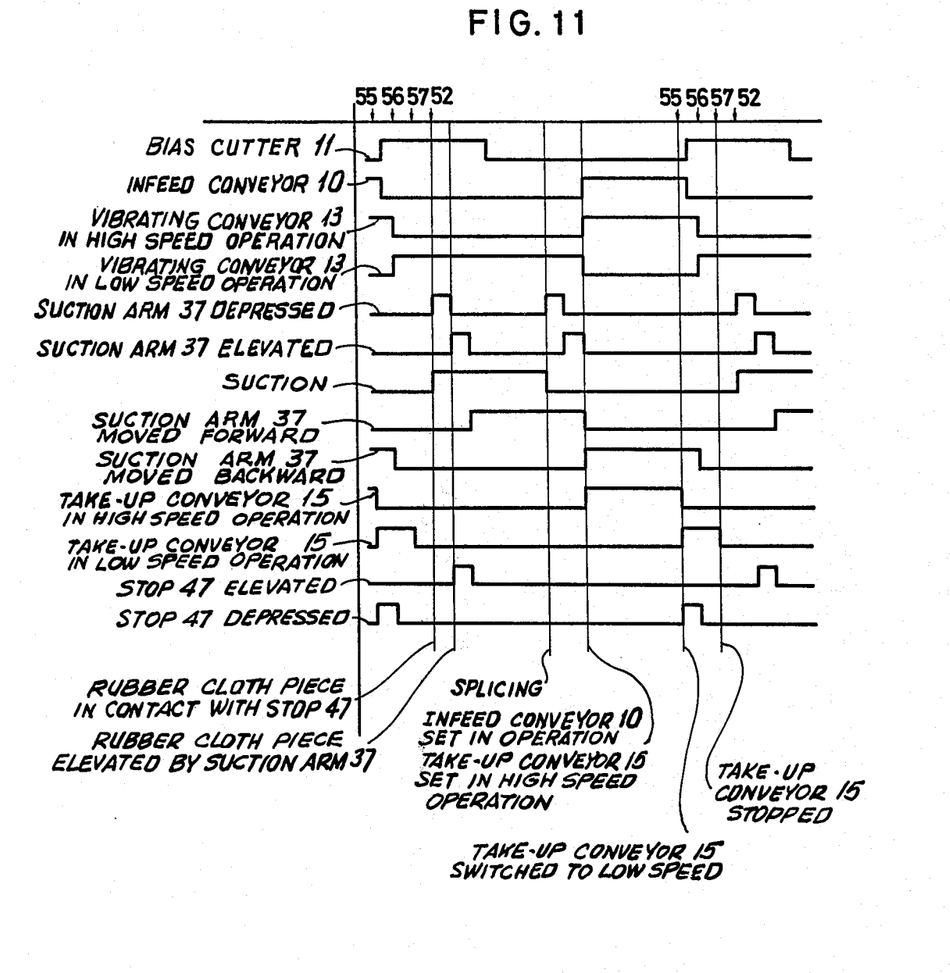
FIG. 11 is a chart explanatory of the automatic operation of the system of FIGS. 1 and 2.

After the suction arm 37 and the stop 42 have been raised to the position shown in FIG. 10F, the take-up conveyor 15 is set in operation at high speed to carry the spliced pieces of rubber cloth away from under the suction arm. The take-up conveyor is switched to low-speed operation when the trailing edge of the rubber cloth piece spliced to the preceding piece has passed under the phototube 55, and is stopped when the said trailing edge has passed under the phototube 57. The second rubber cloth piece is thus held standing by with its trailing edge in the predetermined position on the splicer table 28. The power cylinders 48 are operated at the same time to lower the stop 42 to its position in contact with the splicer table, the stop being also held standing by in that lowered position pending the arrival of the succeeding piece of rubber cloth, as shown in FIG. 10H.

One cycle of splicing operation is thus completed. It will be apparent that this cycle can be repeated sequentially and fully automatically by synchronizing the operations of the infeed conveyor 10 and the take-up conveyor 15.

Although the system according to the invention has been shown and described hereinbefore in very specific aspects thereof to enable those skilled in the art to practice the invention, it will be apparent that the disclosure hereof is meant only to illustrate and explain and not to impose limitations on the invention. Various modifications may obviously be contemplated and resorted to by the specialists without departing from the scope of the invention, as hereinafter defined by the appended claims.

We claim:

1. In a system for successively splicing parallelogram-shaped pieces of rubber cloth together, comprising in combination:

a vibrating conveyor onto which the pieces of rubber cloth of specified shape and size are supplied successively with a selected spacing from one to the next, said vibrating conveyor including: a trough; a guide plate formed along one edge of said trough, and means for imparting vibration to said trough whereby each of the successive pieces of rubber cloth is fed along said guide plate with one edge thereof in sliding contact with said guide plate into position for the splicing action; a splicer for joining the successive pieces of rubber cloth end to end, said splicer including: a table mounted in the direction of the splicing action from said vibrating conveyor and closely spaced therefrom so as to receive the successive pieces of rubber cloth from the vibrating conveyor; an elongate stop supported horizontally above said table for arresting the motion of each of the successive pieces of rubber cloth in a first position on said table; means for moving said stop up and down; a hollow suction arm supported horizontally above said table in side-by side relationship to said stop so as to be in registration with the leading edge of said each piece of cloth in said first position on said table, means communicating with said suction arm for creating a selected vacuum therein whereby the leading edge of said each piece of rubber cloth can be releasably adhered to said suction arm by suction exerted through at least one aperture formed at its bottom; means for moving said suction arm up and down independently of said stop; and means for moving said suction arm back and forth in the direction of the movement of the pieces of rubber cloth from said conveyor to said table so that the leading edge of said each piece of rubber cloth releasably adhered to said suction arm when the latter is in its depressed position is thereby elevated, carried forwardly over said table, and pressed down onto the trailing edge of the preceding piece of rubber cloth which has been held standing by in a second position on said table; and a take-up conveyor for carrying the spliced pieces of rubber cloth away from under such suction arm and said stop over a distance corresponding to the length of each piece of rubber cloth upon completion of each splicing operation.

2. The system as defined in claim 1, wherein said guide plate of said vibrating conveyor has a plurality of perforations arranged to cause the escape therethrough of the air trapped under each piece of rubber cloth on said trough.

3. The system as defined in claim 2, wherein said trough is inclined downwardly toward said guide plate.

4. The system as defined in claim 1, wherein said trough has a plurality of perforations adapted to cause the escape therethrough of the air trapped under each piece of rubber cloth on said trough.

5. The system as defined in claim 4, including an enclosed space formed under said trough in communication with said perforations formed therein, said enclosed space being held at a pressure in a range of up to atmospheric pressure.

6. The system as defined in claim 1, wherein said means for moving said suction arm of said splicer up and down comprises a carriage including a mount located above said table of said splicer, a power cylinder supported vertically on said mount, and an actuating rod extending vertically through said carriage, said actuating rod being coupled at its upper end to a piston rod of said power cylinder and at its lower end to said suction arm.

7. The system as defined in claim 6, wherein said means for moving said suction arm back and forth comprises a frame formed on said table of said splicer, a second power cylinder supported horizontally by said frame, said second power cylinder having a piston rod coupled to said mount formed on said carriage, and guide rod means secured to said frame and slidably supporting said carriage.

8. The system as defined in claim 6, further including means for varying the angular position of said suction arm end of said stop relative to said table of said splicer in accordance with the angle at which the leading edge of each piece of rubber cloth lies with respect to the adjacent edges thereof, said means comprising a support member rotatably mounted on said carriage and having a bore extending vertically therethrough to slidably receive said actuating rod, external splines formed on said actuating rod, said bore being internally splined to mesh with said external splines, worm gear means associated with said support member, and means for revolving said support member relative to said carriage via said worm gear means.

9. The system as defined in claim 1, further including control means for automating said system, said control means comprising a first photoelectric element arranged to depress said suction arm of said splicer when each piece of rubber cloth arrives at said first position on said table, a second photoelectric element arranged to switch said take-up conveyor from high-speed to low-speed operation when each piece of rubber cloth approaches said second position, a third photoelectric element arranged to switch said vibrating conveyor from high-speed to low-speed operation when each piece of rubber cloth approaches said first position, and a fourth photoelectric element arranged to stop the motion of said take-up conveyor when each piece of rubber cloth arrives at said second predetermined position.

10. The system as defined in claim 9, wherein slide rail means extending horizontally above said table slidably supports said second, and third, and said fourth photoelectric elements whereby the positions of said second, said third, and fourth photoelectric elements are variable in accordance with the length of each of the successively supplied pieces of rubber cloth.

* * * * *